United States Patent
Moinzadeh et al.

(10) Patent No.: US 8,036,201 B2
(45) Date of Patent: Oct. 11, 2011

(54) VOICE CHANNEL CONTROL OF WIRELESS PACKET DATA COMMUNICATIONS

(75) Inventors: Kamyar Moinzadeh, Bellevue, WA (US); Darrin L. Garrett, Kingston, WA (US); David C. Quimby, Seattle, WA (US)

(73) Assignee: Airbiquity, Inc., Seattle, WA (US)

( * ) Notice: Subject to any disclaimer, the term of this patent is extended or adjusted under 35 U.S.C. 154(b) by 0 days.

(21) Appl. No.: 12/763,944

(22) Filed: Apr. 20, 2010

(65) Prior Publication Data

US 2010/0202435 A1 Aug. 12, 2010

Related U.S. Application Data

(63) Continuation of application No. 12/372,255, filed on Feb. 17, 2009, now Pat. No. 7,733,853, which is a continuation of application No. 11/048,623, filed on Jan. 31, 2005, now Pat. No. 7,508,810.

(51) Int. Cl.
*H04L 12/66* (2006.01)

(52) U.S. Cl. ......................................... 370/346; 370/449

(58) Field of Classification Search ........................ None
See application file for complete search history.

(56) References Cited

U.S. PATENT DOCUMENTS

| | | |
|---|---|---|
| 3,742,197 A | 6/1973 | Pommerening |
| 3,742,463 A | 6/1973 | Haselwood |
| 3,971,888 A | 7/1976 | Ching |
| 3,984,814 A | 10/1976 | Bailey, Jr. |
| 3,985,965 A | 10/1976 | Field |
| 4,158,748 A | 6/1979 | En |
| 4,218,654 A | 8/1980 | Ogawa |
| 4,310,722 A | 1/1982 | Schaible |
| 4,355,310 A | 10/1982 | Belaigues |
| 4,368,987 A | 1/1983 | Waters |
| 4,494,114 A | 1/1985 | Kaish |
| 4,494,211 A | 1/1985 | Schwartz |
| 4,539,557 A | 9/1985 | Redshaw |
| 4,577,343 A | 3/1986 | Oura |
| 4,595,950 A | 6/1986 | Lofberg |
| 4,598,272 A | 7/1986 | Cox |

(Continued)

FOREIGN PATENT DOCUMENTS

CA 2242495 1/2000

(Continued)

OTHER PUBLICATIONS

Digital Cellular Telecommunications System (Phase 2+); GSM 06.31 version 8.0.1 Release 1999. ETSI EN 300 964 V8.01 (Nov. 2000), pp. 1-13. European Standard (Telecommunications serier). (http://www.etsi.org).

(Continued)

*Primary Examiner* — Min Jung
(74) *Attorney, Agent, or Firm* — Stolowitz Ford Cowger LLP (57) ABSTRACT

A data session with a wireless device ordinarily cannot be initiated from the network side because the wireless device has no predetermined IP or other network address. Methods are disclosed for instead causing the wireless unit to initiate a data session with a target destination, thereby obviating the IP addressing problem. A voice call is first initiated by a requester application to a remote wireless unit. The requester transmits a request message to the remote wireless unit via the wireless voice channel using in-band techniques; preferably including a payload in the polling message that identifies the target destination. In response, the remote wireless unit initiates a packet data session with the target destination.

15 Claims, 2 Drawing Sheets

U.S. PATENT DOCUMENTS

| | | |
|---|---|---|
| 4,599,583 A | 7/1986 | Shimozono |
| 4,607,257 A | 8/1986 | Noguchi |
| 4,630,301 A | 12/1986 | Hohl |
| 4,641,323 A | 2/1987 | Tsang |
| 4,651,157 A | 3/1987 | Gray |
| 4,656,463 A | 4/1987 | Anders |
| 4,675,656 A | 6/1987 | Narcisse |
| 4,685,131 A | 8/1987 | Horne |
| 4,750,197 A | 6/1988 | Denekamp |
| 4,754,255 A | 6/1988 | Sanders |
| 4,766,589 A | 8/1988 | Fisher |
| 4,776,003 A | 10/1988 | Harris |
| 4,831,647 A | 5/1989 | D'Avello |
| 4,860,336 A | 8/1989 | D'Avello |
| 4,914,651 A | 4/1990 | Lusignan |
| 4,918,425 A | 4/1990 | Greenberg |
| 4,918,717 A | 4/1990 | Bissonnette |
| 4,926,444 A | 5/1990 | Hamilton |
| 4,941,155 A | 7/1990 | Chuang |
| 4,965,821 A | 10/1990 | Bishop |
| 4,977,609 A | 12/1990 | McClure |
| 4,984,238 A | 1/1991 | Watanabe |
| 5,014,344 A | 5/1991 | Goldberg |
| 5,025,455 A | 6/1991 | Nguyen |
| 5,036,537 A | 7/1991 | Jeffers |
| 5,040,214 A | 8/1991 | Grossberg et al. |
| 5,043,736 A | 8/1991 | Darnell |
| 5,081,667 A | 1/1992 | Drori |
| 5,095,307 A | 3/1992 | Shimura |
| 5,119,403 A | 6/1992 | Krishnan |
| 5,119,504 A | 6/1992 | Durboraw, III |
| 5,134,644 A | 7/1992 | Garton |
| 5,155,689 A | 10/1992 | Wortham |
| 5,191,611 A | 3/1993 | Lang |
| 5,201,071 A | 4/1993 | Webb |
| 5,203,012 A | 4/1993 | Patsiokas |
| 5,208,446 A | 5/1993 | Martinez |
| 5,212,831 A | 5/1993 | Chuang |
| 5,214,556 A | 5/1993 | Kilbel |
| 5,218,618 A | 6/1993 | Sagey |
| 5,223,844 A | 6/1993 | Mansell |
| 5,227,776 A | 7/1993 | Starefoss |
| 5,235,633 A | 8/1993 | Dennison |
| 5,245,634 A | 9/1993 | Averbuch |
| 5,245,647 A | 9/1993 | Grouffal |
| 5,272,747 A | 12/1993 | Meads |
| 5,282,204 A | 1/1994 | Shpancer |
| 5,289,372 A | 2/1994 | Guthrie |
| 5,301,353 A | 4/1994 | Borras |
| 5,301,359 A | 4/1994 | Van Den Heuvel |
| 5,305,384 A | 4/1994 | Ashby, III |
| 5,317,309 A | 5/1994 | Vercellotti |
| 5,331,635 A | 7/1994 | Ota |
| 5,333,175 A | 7/1994 | Ariyavisitakul |
| 5,334,974 A | 8/1994 | Simms |
| 5,347,272 A | 9/1994 | Ota |
| 5,363,375 A | 11/1994 | Chuang |
| 5,363,376 A | 11/1994 | Chuang |
| 5,365,450 A | 11/1994 | Schuchman |
| 5,365,577 A | 11/1994 | Davis |
| 5,379,224 A | 1/1995 | Brown |
| 5,381,129 A | 1/1995 | Boardman |
| 5,388,147 A | 2/1995 | Grimes |
| 5,388,247 A | 2/1995 | Goodwin |
| 5,389,934 A | 2/1995 | Kass |
| 5,390,216 A | 2/1995 | Bilitza |
| 5,396,539 A | 3/1995 | Slekys |
| 5,396,653 A | 3/1995 | Kivari |
| 5,408,684 A | 4/1995 | Yunoki |
| 5,410,541 A | 4/1995 | Hotto |
| 5,410,739 A | 4/1995 | Hart |
| 5,414,432 A | 5/1995 | Penny, Jr. |
| 5,418,537 A | 5/1995 | Bird |
| 5,420,592 A | 5/1995 | Johnson |
| 5,422,816 A | 6/1995 | Sprague |
| 5,428,636 A | 6/1995 | Meier |
| 5,438,337 A | 8/1995 | Aguado |
| 5,440,491 A | 8/1995 | Kawano |
| 5,448,622 A | 9/1995 | Huttunen |
| 5,450,130 A | 9/1995 | Foley |
| 5,459,469 A | 10/1995 | Schuchman |
| 5,461,390 A | 10/1995 | Hoshen |
| 5,475,864 A | 12/1995 | Hamabe |
| 5,475,868 A | 12/1995 | Duque-Anton |
| 5,479,480 A | 12/1995 | Scott |
| 5,479,482 A | 12/1995 | Grimes |
| 5,483,549 A | 1/1996 | Weinberg |
| 5,491,690 A | 2/1996 | Alfonsi |
| 5,497,149 A | 3/1996 | Fast |
| 5,504,491 A | 4/1996 | Chapman |
| 5,506,888 A | 4/1996 | Hayes |
| 5,509,035 A | 4/1996 | Teidemann, Jr. |
| 5,510,797 A | 4/1996 | Abraham |
| 5,513,111 A | 4/1996 | Wortham |
| 5,515,043 A | 5/1996 | Berard |
| 5,519,403 A | 5/1996 | Bickley |
| 5,519,621 A | 5/1996 | Wortham |
| 5,528,232 A | 6/1996 | Verma |
| 5,530,701 A | 6/1996 | Stillman |
| 5,537,458 A | 7/1996 | Suomi |
| 5,539,810 A | 7/1996 | Kennedy, III |
| 5,543,789 A | 8/1996 | Behr |
| 5,544,222 A | 8/1996 | Robinson |
| 5,544,225 A | 8/1996 | Kennedy, III |
| 5,546,445 A | 8/1996 | Dennison |
| 5,550,551 A | 8/1996 | Alesio |
| 5,551,066 A | 8/1996 | Stillman |
| 5,555,286 A | 9/1996 | Tendler |
| 5,555,520 A | 9/1996 | Sudo |
| 5,557,254 A | 9/1996 | Johnson |
| 5,565,858 A | 10/1996 | Guthrie |
| 5,566,173 A | 10/1996 | Steinbrecher |
| 5,572,204 A | 11/1996 | Timm |
| 5,576,716 A | 11/1996 | Sadler |
| 5,587,715 A | 12/1996 | Lewis |
| 5,590,396 A | 12/1996 | Henry |
| 5,594,425 A | 1/1997 | Ladner |
| RE35,498 E | 4/1997 | Barnard |
| 5,619,684 A | 4/1997 | Goodwin |
| 5,621,388 A | 4/1997 | Sherburne |
| 5,625,668 A | 4/1997 | Loomis |
| 5,627,517 A | 5/1997 | Theimer |
| 5,630,206 A | 5/1997 | Urban |
| 5,635,450 A | 6/1997 | Mayer |
| 5,637,355 A | 6/1997 | Stanforth |
| 5,640,444 A | 6/1997 | O'Sullivan |
| 5,650,770 A | 7/1997 | Schlage |
| 5,663,734 A | 9/1997 | Krasner |
| 5,666,357 A | 9/1997 | Jangi |
| 5,668,803 A | 9/1997 | Tymes |
| 5,673,305 A | 9/1997 | Ross |
| 5,680,439 A | 10/1997 | Aguilera |
| 5,686,910 A | 11/1997 | Timm |
| 5,687,215 A | 11/1997 | Timm |
| 5,687,216 A | 11/1997 | Svensson |
| 5,691,980 A | 11/1997 | Welles, II |
| 5,703,598 A | 12/1997 | Emmons |
| 5,711,013 A | 1/1998 | Collett |
| 5,712,619 A | 1/1998 | Simkin |
| 5,712,899 A | 1/1998 | Pace, II |
| 5,724,243 A | 3/1998 | Westerlage |
| 5,726,893 A | 3/1998 | Schuchman |
| 5,726,984 A | 3/1998 | Kubler |
| 5,731,757 A | 3/1998 | Layson, Jr. |
| 5,732,326 A | 3/1998 | Maruyama |
| 5,734,981 A | 3/1998 | Kennedy, III |
| 5,742,233 A | 4/1998 | Hoffman |
| 5,748,083 A | 5/1998 | Rietkerk |
| 5,748,084 A | 5/1998 | Isikoff |
| 5,751,246 A | 5/1998 | Hertel |
| 5,752,186 A | 5/1998 | Malackowski |
| 5,752,193 A | 5/1998 | Scholefield |
| 5,752,195 A | 5/1998 | Tsuji |
| 5,754,554 A | 5/1998 | Nakahara |
| D395,250 S | 6/1998 | Kabler |
| 5,761,204 A | 6/1998 | Grob |
| 5,761,292 A | 6/1998 | Wagner |

| Patent | Date | Name |
|---|---|---|
| 5,771,001 A | 6/1998 | Cobb |
| 5,771,455 A | 6/1998 | Kennedy, III |
| 5,774,876 A | 6/1998 | Woolley |
| 5,781,156 A | 7/1998 | Krasner |
| 5,784,422 A | 7/1998 | Heermann |
| 5,786,789 A | 7/1998 | Janky |
| 5,790,842 A | 8/1998 | Charles |
| 5,794,124 A | 8/1998 | Ito |
| 5,796,808 A | 8/1998 | Scott |
| 5,797,091 A | 8/1998 | Clisel |
| 5,804,810 A | 9/1998 | Woolley |
| 5,805,576 A | 9/1998 | Worley, III |
| 5,812,087 A | 9/1998 | Krasner |
| 5,812,522 A | 9/1998 | Lee |
| 5,815,114 A | 9/1998 | Speasl |
| RE35,916 E | 10/1998 | Dennison |
| 5,825,283 A | 10/1998 | Camhi |
| 5,825,327 A | 10/1998 | Krasner |
| 5,826,188 A | 10/1998 | Tayloe |
| 5,831,574 A | 11/1998 | Krasner |
| 5,832,394 A | 11/1998 | Wortham |
| 5,835,907 A | 11/1998 | Newman |
| 5,838,237 A | 11/1998 | Revell |
| 5,841,396 A | 11/1998 | Krasner |
| 5,841,842 A | 11/1998 | Baum |
| 5,842,141 A | 11/1998 | Vaihoja |
| 5,850,392 A | 12/1998 | Wang |
| 5,856,986 A | 1/1999 | Sobey |
| 5,864,578 A | 1/1999 | Yuen |
| 5,864,763 A | 1/1999 | Leung |
| 5,870,675 A | 2/1999 | Tuutijarvi |
| 5,874,914 A | 2/1999 | Krasner |
| 5,881,069 A | 3/1999 | Cannon |
| 5,881,373 A | 3/1999 | Elofsson |
| 5,884,214 A | 3/1999 | Krasner |
| 5,886,634 A | 3/1999 | Muhme |
| 5,890,108 A | 3/1999 | Yeldener |
| 5,892,441 A | 4/1999 | Woolley |
| 5,892,454 A | 4/1999 | Schipper |
| 5,901,179 A | 5/1999 | Urabe |
| 5,911,129 A | 6/1999 | Towell |
| 5,912,886 A | 6/1999 | Takahashi |
| 5,913,170 A | 6/1999 | Wortham |
| 5,917,449 A | 6/1999 | Sanderford |
| 5,918,180 A | 6/1999 | Dimino |
| 5,930,340 A | 7/1999 | Bell |
| 5,930,722 A | 7/1999 | Han |
| 5,933,468 A | 8/1999 | Kingdon |
| 5,936,526 A | 8/1999 | Klein |
| 5,937,355 A | 8/1999 | Joong |
| 5,940,598 A | 8/1999 | Strauss |
| 5,945,944 A | 8/1999 | Krasner |
| 5,946,304 A | 8/1999 | Chapman |
| 5,946,611 A | 8/1999 | Dennison |
| 5,949,335 A | 9/1999 | Maynard |
| 5,953,694 A | 9/1999 | Pillekamp |
| 5,960,363 A | 9/1999 | Mizikovsky |
| 5,961,608 A | 10/1999 | Onosaka |
| 5,963,130 A | 10/1999 | Schlager |
| 5,963,134 A | 10/1999 | Bowers |
| 5,970,130 A | 10/1999 | Katko |
| 5,978,676 A | 11/1999 | Guridi |
| 5,991,279 A | 11/1999 | Haugli |
| 5,999,124 A | 12/1999 | Sheynblat |
| 5,999,126 A | 12/1999 | Ito |
| 6,002,363 A | 12/1999 | Krasner |
| 6,006,189 A | 12/1999 | Strawczynski |
| 6,009,325 A | 12/1999 | Retzer |
| 6,009,338 A | 12/1999 | Iwata |
| 6,011,973 A | 1/2000 | Valentine |
| 6,014,089 A | 1/2000 | Tracy |
| 6,014,090 A | 1/2000 | Rosen |
| 6,014,376 A | 1/2000 | Abreu |
| 6,018,654 A | 1/2000 | Valentine |
| 6,021,163 A | 2/2000 | Hoshi |
| 6,024,142 A | 2/2000 | Bates |
| 6,031,489 A | 2/2000 | Wyrwas |
| 6,032,037 A | 2/2000 | Jeffers |
| 6,038,310 A | 3/2000 | Hollywood |
| 6,038,595 A | 3/2000 | Ortony |
| 6,041,124 A | 3/2000 | Sugita |
| 6,044,257 A | 3/2000 | Boling |
| 6,049,971 A | 4/2000 | Petit |
| 6,055,434 A | 4/2000 | Seraj |
| 6,057,756 A | 5/2000 | Engellenner |
| 6,067,044 A | 5/2000 | Whelan |
| 6,067,457 A | 5/2000 | Erickson |
| 6,069,570 A | 5/2000 | Herring |
| 6,070,089 A | 5/2000 | Brophy |
| 6,075,458 A | 6/2000 | Ladner |
| 6,076,099 A | 6/2000 | Chen |
| 6,081,523 A | 6/2000 | Merchant |
| 6,091,969 A | 7/2000 | Brophy |
| 6,097,760 A | 8/2000 | Spicer |
| 6,101,395 A | 8/2000 | Keshavachar |
| 6,122,271 A | 9/2000 | McDonald |
| 6,122,514 A | 9/2000 | Spaur |
| 6,131,067 A | 10/2000 | Girerd |
| 6,131,366 A | 10/2000 | Fukuda |
| 6,133,874 A | 10/2000 | Krasner |
| 6,140,956 A | 10/2000 | Hillman |
| 6,144,336 A | 11/2000 | Preston |
| 6,151,493 A | 11/2000 | Sasakura |
| 6,154,658 A | 11/2000 | Caci |
| 6,166,688 A | 12/2000 | Cromer |
| 6,169,497 B1 | 1/2001 | Robert |
| 6,173,194 B1 | 1/2001 | Vanttila |
| 6,175,307 B1 | 1/2001 | Peterson |
| 6,181,253 B1 | 1/2001 | Eschenbach |
| 6,195,736 B1 | 2/2001 | Lisle |
| 6,208,959 B1 | 3/2001 | Jonsson |
| 6,212,207 B1 | 4/2001 | Nichols |
| 6,226,529 B1 | 5/2001 | Bruno |
| 6,236,652 B1 | 5/2001 | Preston |
| 6,249,227 B1 | 6/2001 | Brady |
| 6,266,008 B1 | 7/2001 | Huston |
| 6,269,392 B1 | 7/2001 | Cotichini |
| 6,272,315 B1 | 8/2001 | Chang |
| 6,275,990 B1 | 8/2001 | Dapper |
| 6,282,430 B1 | 8/2001 | Young |
| 6,288,645 B1 | 9/2001 | McCall |
| 6,295,461 B1 | 9/2001 | Palmer |
| 6,300,863 B1 | 10/2001 | Cotichini |
| 6,300,875 B1 | 10/2001 | Schafer |
| 6,301,480 B1 | 10/2001 | Kennedy, III |
| 6,304,186 B1 | 10/2001 | Rabanne |
| 6,304,637 B1 | 10/2001 | Mirashrafi |
| 6,307,471 B1 | 10/2001 | Xydis |
| 6,308,060 B2 | 10/2001 | Wortham |
| 6,320,535 B1 | 11/2001 | Hillman |
| 6,321,091 B1 | 11/2001 | Holland |
| 6,326,736 B1 | 12/2001 | Kang |
| 6,327,533 B1 | 12/2001 | Chou |
| 6,343,217 B1 | 1/2002 | Borland |
| 6,345,251 B1 | 2/2002 | Jansson |
| 6,351,495 B1 | 2/2002 | Tarraf |
| 6,358,145 B1 | 3/2002 | Wong |
| 6,359,923 B1 | 3/2002 | Agee |
| 6,362,736 B1 | 3/2002 | Gehlot |
| 6,373,842 B1 | 4/2002 | Coverdale |
| 6,405,033 B1 | 6/2002 | Kennedy, III |
| 6,430,176 B1 * | 8/2002 | Christie, IV .................. 370/355 |
| 6,434,198 B1 | 8/2002 | Tarraf |
| 6,466,582 B2 | 10/2002 | Venters |
| 6,470,046 B1 | 10/2002 | Scott |
| 6,477,633 B1 | 11/2002 | Grimmett |
| 6,493,338 B1 | 12/2002 | Preston |
| 6,516,198 B1 | 2/2003 | Tendler |
| 6,519,260 B1 | 2/2003 | Galyas |
| 6,522,265 B1 | 2/2003 | Hillman |
| 6,526,026 B1 | 2/2003 | Menon |
| 6,529,744 B1 | 3/2003 | Birkler |
| 6,611,804 B1 | 8/2003 | Dörbecker |
| 6,614,349 B1 | 9/2003 | Proctor |
| 6,617,979 B2 | 9/2003 | Yoshioka |
| 6,628,967 B1 | 9/2003 | Yue |
| 6,665,333 B2 | 12/2003 | McCrady |
| 6,677,894 B2 | 1/2004 | Sheynblat |

| | | |
|---|---|---|
| 6,681,121 B1 | 1/2004 | Preston |
| 6,683,855 B1 | 1/2004 | Bordogna |
| 6,690,681 B1 | 2/2004 | Preston |
| 6,690,922 B1 | 2/2004 | Lindemann |
| 6,697,987 B2 | 2/2004 | Lee |
| 6,700,867 B2 | 3/2004 | Classon |
| 6,747,571 B2 | 6/2004 | Fierro |
| 6,754,265 B1 | 6/2004 | Lindemann |
| 6,771,629 B1 | 8/2004 | Preston |
| 6,778,645 B1 | 8/2004 | Rao |
| 6,799,050 B1 | 9/2004 | Krasner |
| 6,836,515 B1 | 12/2004 | Kay |
| 6,845,153 B2 | 1/2005 | Tibutius |
| 6,917,449 B2 | 7/2005 | Nakajima |
| 6,940,809 B2 | 9/2005 | Sun |
| 6,981,022 B2 | 12/2005 | Boundy |
| 6,993,362 B1 | 1/2006 | Aberg |
| 7,092,370 B2 | 8/2006 | Jiang |
| 7,103,550 B2 | 9/2006 | Gallagher |
| 7,151,768 B2 | 12/2006 | Preston |
| 7,164,662 B2 | 1/2007 | Preston |
| 7,206,305 B2 | 4/2007 | Preston |
| 7,206,574 B2 | 4/2007 | Bright |
| 7,215,965 B2 | 5/2007 | Fournier |
| 7,221,669 B2 | 5/2007 | Preston |
| 7,269,188 B2 | 9/2007 | Smith |
| 7,286,522 B2 | 10/2007 | Preston |
| 7,317,696 B2 | 1/2008 | Preston |
| 7,398,100 B2 | 7/2008 | Harris |
| 7,426,466 B2 | 9/2008 | Ananthapadmanabhan |
| 7,430,428 B2 | 9/2008 | Van Bosch |
| 7,477,906 B2 | 1/2009 | Radic |
| 7,483,418 B2 | 1/2009 | Maurer |
| 7,511,611 B2 | 3/2009 | Sabino |
| 7,512,098 B2 | 3/2009 | Jiang |
| 7,562,393 B2 | 7/2009 | Buddhikot |
| 7,583,959 B2 | 9/2009 | Holmes |
| 7,593,449 B2 | 9/2009 | Shattil |
| 7,606,555 B2 | 10/2009 | Walsh |
| 7,856,240 B2 | 12/2010 | Gunn |
| 2002/0095293 A1* | 7/2002 | Gallagher et al. ............ 704/270 |
| 2002/0111167 A1 | 8/2002 | Nguyen |
| 2002/0122401 A1 | 9/2002 | Xiang |
| 2003/0016639 A1 | 1/2003 | Kransmo |
| 2003/0073406 A1 | 4/2003 | Benjamin |
| 2003/0147401 A1 | 8/2003 | Kyronaho |
| 2003/0227939 A1 | 12/2003 | Yukie |
| 2004/0034529 A1 | 2/2004 | Hooper, III |
| 2004/0171370 A1 | 9/2004 | Natarajan |
| 2004/0192345 A1 | 9/2004 | Osborn |
| 2005/0031097 A1 | 2/2005 | Rabenko |
| 2005/0090225 A1 | 4/2005 | Muehleisen |
| 2005/0111563 A1 | 5/2005 | Tseng |
| 2005/0147057 A1 | 7/2005 | LaDue |
| 2005/0187882 A1 | 8/2005 | Sovio |
| 2005/0207511 A1 | 9/2005 | Madhavan |
| 2005/0215228 A1* | 9/2005 | Fostick et al. ................ 455/403 |
| 2005/0226202 A1 | 10/2005 | Zhang |
| 2006/0171368 A1 | 8/2006 | Moinzadeh |
| 2006/0246910 A1 | 11/2006 | Petermann |
| 2006/0276196 A1* | 12/2006 | Jiang et al. .................... 455/446 |
| 2007/0087756 A1 | 4/2007 | Hoffberg |
| 2007/0124625 A1 | 5/2007 | Hassan |
| 2007/0155360 A1 | 7/2007 | An |
| 2007/0211624 A1 | 9/2007 | Schmidt |
| 2007/0258398 A1 | 11/2007 | Chestnutt |
| 2007/0264964 A1 | 11/2007 | Birmingham |
| 2008/0025295 A1 | 1/2008 | Elliott |
| 2008/0039017 A1 | 2/2008 | Kim |
| 2008/0056469 A1 | 3/2008 | Preston |
| 2008/0107094 A1* | 5/2008 | Borella et al. ................ 370/342 |
| 2008/0132200 A1 | 6/2008 | Shinoda |
| 2008/0143497 A1 | 6/2008 | Wasson |
| 2008/0182570 A1 | 7/2008 | Kuhl |
| 2008/0212820 A1 | 9/2008 | Park |
| 2008/0266064 A1 | 10/2008 | Curran |
| 2008/0294340 A1 | 11/2008 | Schmidt |
| 2009/0055516 A1 | 2/2009 | Zhodzishsky |
| 2009/0077407 A1 | 3/2009 | Akimoto |
| 2009/0110033 A1 | 4/2009 | Shattil |
| 2009/0265173 A1 | 10/2009 | Madhavan |
| 2009/0298428 A1 | 12/2009 | Shin |
| 2009/0306976 A1 | 12/2009 | Joetten |
| 2010/0211660 A1* | 8/2010 | Kiss et al. ..................... 709/221 |

FOREIGN PATENT DOCUMENTS

| | | |
|---|---|---|
| DE | 44 24 412 A1 | 1/1996 |
| EP | 0 242 099 A2 | 10/1987 |
| EP | 0 528 090 A1 | 8/1991 |
| EP | 0 512 789 A2 | 5/1992 |
| EP | 0 501 058 A2 | 9/1992 |
| EP | 0 545 783 A1 | 11/1992 |
| EP | 545783 | 11/1992 |
| EP | 0 545 753 A1 | 6/1993 |
| EP | 0 580 397 A2 | 1/1994 |
| EP | 0889610 A2 | 1/1999 |
| EP | 0 896 442 A1 | 2/1999 |
| EP | 01 950 402 | 12/2004 |
| EP | 1 843 503 A2 | 10/2007 |
| GB | 2 290 005 A | 5/1994 |
| JP | 03232349 | 10/1991 |
| JP | 5130008 | 5/1993 |
| JP | 5252099 | 9/1993 |
| JP | 6077887 | 3/1994 |
| JP | 11109062 | 4/1999 |
| TW | 2010/18163 A | 5/2010 |
| WO | WO 89/12835 A1 | 12/1989 |
| WO | WO 91/07044 A1 | 5/1991 |
| WO | WO 95/21511 A1 | 8/1995 |
| WO | WO 96/07110 A1 | 3/1996 |
| WO | WO 96/15636 A1 | 5/1996 |
| WO | WO 96/18275 A1 | 6/1996 |
| WO | WO 98/34164 A1 | 8/1998 |
| WO | WO 98/34359 A1 | 8/1998 |
| WO | WO 98/53573 A2 | 11/1998 |
| WO | WO 98/59256 A2 | 12/1998 |
| WO | WO 98/59257 A1 | 12/1998 |
| WO | WO 99/14885 A2 | 3/1999 |
| WO | WO 99/56143 A1 | 4/1999 |
| WO | WO 99/56144 A1 | 4/1999 |
| WO | WO 99/36795 A1 | 7/1999 |
| WO | WO 99/49677 A1 | 9/1999 |
| WO | WO 00/11893 A1 | 3/2000 |
| WO | WO 01/78249 A1 | 10/2001 |
| WO | WO 01/99295 A2 | 12/2001 |
| WO | WO 02/054694 A1 | 7/2002 |
| WO | WO 03/034235 A1 | 4/2003 |
| WO | WO 03/081373 A2 | 10/2003 |
| WO | WO 2009/149356 A2 | 12/2009 |

OTHER PUBLICATIONS

Coleman, A., et al., "Subjective Performance Evaluation of the RPE-LTP Codec for the Pan-European Cellular Digital Radio System," Globecom '89, IEEE Global Telecommunications Conference and Exhibition, vol. 2, Nov. 27-30, 1989, pp. 758-761; 1075-1079, IEEE, New York, New York.

Coleman, A., et al., "Subjective Performance Evaluation of the RPE-LTP Codec for the Pan-European Cellular Digital Mobile Radio System," Globecom '89, IEEE Global Telecommunications Conference and Exhibition, vol. 2, Nov. 27-30, 1989, pp. 1075-1079, IEEE, New York, New York.

Lin, D., et al., "Data Compression of Voiceband Modem Signals," 40th sup. th IEEE Vehicular Technology Conference: On the Move in the 90's. May 6-9, 1990, pp. 323-325, IEEE, New York, New York.

Feher, "Modems for Emerging Digital Cellular-Mobile Radio System," IEEE Trans. on Vehicular Technology, vol. 40, No. 2, May 1991, pp. 355-365.

Christ, Thomas W., "A Prison Guard Duress Alarm Location System," Proceedings of the IEEE 1993 International Carnahan Conference on Security Technology: Security Technology, Oct. 13-15, 1993, Copyright 1993 IEEE.

Brian W. Martin, "Watchlt: A Fully Supervised Identification, Location and Tracking System," Proceedings of the IEEE, 29th Annual 1995 International Carnahan Conference on Security Technology, Oct. 1995.

Reut, Anton B., "Remote Monitoring of Military Assets Using Commercial Leo Satellites," IEEE Universal Communications Conference Record, Nov. 6-8, 1995, Copyright 1995 IEEE.
Brown, et al., "A Reconfigurable Modem for Increased Network . . ." IEEE Trans. on Circuits & Systems for Video Technology, vol. 6, No. 2, Apr. 1996, pp. 215-224.
Jain et al, Potential Networking Applications of Global Positioning Systems (GPS), downloadable at http://www.cis.ohio-state.edu/~jain/papers/gps.htm, pp. 1-40, Apr. 1996.
U.S. Appl. No. 60/047,034, filed May 19, 1997; Applicant: Preston.
U.S. Appl. No. 60/047,140, filed May 20, 1997; Applicant: Preston.
U.S. Appl. No. 60/048,369, filed Jun. 3, 1997; Applicant: Preston.
U.S. Appl. No. 60/048,385, filed Jun. 3, 1997; Applicant: Preston.
U.S. Appl. No. 60/055,497, filed Aug. 13, 1997; Applicant: Preston.
Mueller, A.J. et al., "A DSP Implemented dual 9600/7200 BPS TCM Modem for Mobile Communications Over FM Voice Radios," Proceedings of the 1997 6th IEEE Pacific rim Conference on Communications, Computers and Signal Processing, vol. 2, Aug. 20-22, 1997, pp. 758-761, IEEE, New York, New York.
FCC E911 Order, CC Docket No. 94-102; dated Nov. 23, 1998.
Vaha-Sipila, A., URLs for Telephone Calls, Request for Comments: 2806, Network Working Group, Apr. 2000, 16 pages.
International Search Report PCT/US00/13288; dated May 15, 2000; Applicant: Integrated Data Communications Inc.
International Search Report PCT/US00/01157; dated May 23, 2000; Applicant: Integrated Data Communications Inc.
Office Action in U.S. Appl. No. 09/625,159 dated Apr. 9, 2003; 15 pages.
3GPP2 Access Network Interfaces Technical Specification Group, "3GGP2 Access Network Interfaces TSG (TSG-A) #60, Meeting Summary," Coeur d'Alene, Idaho, Apr. 19, 2004, pp. 1-5.
3rd Generation Partnership Project; Technical Specification Group Services and System Aspects Push Architecture (Rel. 6); 3GPP TR 23.976; vol. 3-SA2, No. V6.1.0; Jun. 1, 2004; pp. 1-34.
Universal Mobile Telecommunications System (UMTS); Push Architecture (3GPP TR 23.976 version 6.1.0 Release 6); Jun. 2004; 36 pages.
Vocal Technologies, Ltd. Home Page, "Audio Codecs," http://www.vocal.com/data_sheets/audio_codecs.html?glad, accessed Jun. 12, 2005.
International Search Report for PCT/US06/03416, dated Feb. 5, 2007, 3 pages.
Written Opinion of the International Searching Authority for PCT/US06/03416, dated Feb. 5, 2007, 3 pages.
Phifer, Lisa A., Surfing the Web Over Wireless, Jan. 1998, http://www.corecom.com/html/ wireless.html, printed May 22, 2007.
International Preliminary Report on Patentability in PCT/US2006/022985 dated Jan. 3, 2008; 6 pages.
International Search Report and Written Opinion of International Application No. PCT/US07/64443, dated Sep. 15, 2008.
USPTO Search Authority; PCT/US08/80555 International Search Report; Dec. 19, 2008, 11 pages.
PCT/US2009/056834 International Search Report and Written Opinion dated Dec. 30, 2009; 12 pages.

Protean Research Group, "Anycast Routing for Mobile Services (ARMS) Project Overview," Published on the Internet at <http://tang.itd.nrl.navy.mll/5522/anycast/anycast_index.html>.
Werb, Jay and Colin Lanzl, "The Next Generation of Control: Local Positioning," abstract, Feb. 1999, vol. 26.
Werb, Jay and Colin Lanzl, "Designing a Positioning System for Finding Things and People Indoors," IEEE Spectrum, Sep. 1998.
International Search Report PCT/US02/00996; dated Jun. 24, 2002; Applicant: Airbiquity, Inc.
Lockwood Technology Corporation, "Asset Management," copyright 2002 by Lockwood Technology Corporation, published on the Internet at http://www.lockwoodtechnology.com/ asset_tracking.html, printed May 29, 2002.
Janus Technologies, Inc., "ProxTrak Asset Tracking Interface," copyright 2000 Janus Technologies, Inc., published on the Internet at http://www.janus-tech.com/Products/ProxTrax. html, printed May 29, 2002.
"Tracking," published on the Internet at http://www.wisetrack.com/tracking.html, posted May 29, 2002, Copyright 2001 by TVL, Inc.
McNichols, Shawn, "Keeping Your Assets Safe," published on the Internet at http://www.securitymagazine.com,CDA/ArticleInformation/features/BNP_Features, posted Feb. 14, 2002, Copyright 2001-2002 by Business News Publishing Co.
Office Action in U.S. Appl. No. 09/677,486 dated Oct. 16, 2001; 9 pages.
Bilbao, Alfonso, m-Security (Security and Mobile Telephony), Proceedings of the IEEE 35th Annual 2001, International Carnahan Conference on Security Technology, Oct. 16-19, 2001.
International Search Report PCT/US01/27238; dated Aug. 30, 2001; Applicant: Airbiquity, Inc.
International Search Report PCT/US01/20021, dated Aug. 21, 2001; Applicant: Airbiquity, Inc.
International Search Report PCT/US01/19845; dated Jun. 22, 2001; Applicant: Airbiquity, Inc.
Lavigne, R.E. and P. Eng, "Trunking Versus Conventional Radio System," Proceedings of the IEEE, 34th Annual 2000 International Carnahan Conference on Security Technology, Oct. 23-25, 2000.
PCT International Search Report dated Nov. 27, 2000 for International Application No. PCT/US00/13288.
Ayanoglu, E., "Adaptive ARQ/FEC for Multitone Transmission in Wireless Networks" Global Telecommunications Conference, 1995. Conference Record. Communication Theory Mini-Conference, Globecom '95., IEEE Singapore Nov. 13-17, 1995, New York, NY, USA, IEEE, US Lnkd. vol. 3. Whole Document.
Lemke A. C., et al.: "Voice Over Data and Data Over Voice: Evolution of the Alcatel 1000. Seamless Evolution of the Alcatel 1000 Switching System will Support the Move to Voice and Data Convergence." Electrical Communication, Alcatel. Brussels, BE, Apr. 1, 1999. Abstract; Figure 2.
Benelli G., et al.: "A Coding and Retransmission Protocol for Mobile Radio Data Transmission."Vehicluar Technology Conference, 1999. VTC 1999—Fall. IEEE VTS 50th Amsterdam Netherlands Sep. 19-22, 1999. Abstract Secion II.

* cited by examiner

VOICE CHANNEL CONTROL OF WIRELESS PACKET DATA COMMUNICATIONS

CROSS REFERENCE TO RELATED APPLICATIONS

This application is a continuation of U.S. application Ser. No. 12/372,255, filed Feb. 17, 2009, which is a continuation of U.S. application Ser. No. 11/048,623, filed Jan. 31, 2005, now U.S. Pat. No. 7,508,810, each of which is incorporated by reference herein in its entirety.

COPYRIGHT NOTICE

© 2010 Airbiquity Inc. A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR §1.71(d).

TECHNICAL FIELD

This invention pertains to data communications via wireless communications networks, and more specifically it relates to use of the voice channel to trigger a network initiated data session such as an IP session.

BACKGROUND OF THE INVENTION

Data transfer services in the wireless domain are known and certainly still evolving. Examples include SMS (short messaging service) and other SS7 control channel services. They can be used, for example, for text messaging. They do not affect the voice channels, but offer very limited bandwidth, so the amounts of data transferred are quite limited.

The WAP (Wireless Application Protocol) specifications and software offer some improved services. For example, they can be implemented to provide limited Internet access to a mobile unit. (We use the term "mobile unit" herein to refer broadly to any device with wireless connectivity, including without limitation a cell phone, PDA, laptop computer, palmtop, motor vehicle, etc.). The WAP services, however, require that the mobile unit itself be WAP enabled, and that the wireless carrier network also be WAP enabled. Thus, wireless carriers have to deploy and maintain WAP gateways at the edges of the network to provide WAP services. Some mobile units, and some networks or geographic areas may not be WAP enabled, so these services would not be available for data communication.

One approach to wireless data transfer that does not require changes in the wireless network infrastructure, although it requires specific implementation at both endpoints of a session, is the use of "in-band" data transfer. As the name implies, this technique transfers data in the voice channel, using carefully selected and timed audio frequency tones. (Commonly, wireless data transfer services do not use the voice channel at all.) In-band or voice channel data transfer can be done with little or no interruption of a voice conversation. Details of in-band signaling are explained in U.S. Pat. Nos. 6,144,336; 6,690,681 and 6,493,338 all incorporated wherein by this reference. These types of in-voice-channel data communications have two primary advantages: the wireless voice channel is reliable, and the technique works transparently across networks and carriers throughout the country and beyond. The data simply passes transparently through the voice service, as it "looks" like voice. However, in-band signaling provides only a very low bandwidth up to around 400 bps. That makes it almost useless for transferring significant amounts of data.

Higher bandwidth wireless data services are rapidly becoming available throughout the world. These services operate over dedicated data channels, not the voice channels. The newer specifications, so-called "3G" or third generation wireless technologies, while not yet widely implemented, promise packet data rates as follows, according to IMT-2000 standards:

2 Mbps for fixed environment
    384 Mbps for pedestrian (i.e. slow-moving mobile unit)
    144 kbps for vehicular traffic One problem, however, with virtually all wireless data services, is the difficulty in accessing those services in a network "polling" type of application. Polling (or "pulling data") here refers to contacting a mobile unit to pull or retrieve digital data needed by a requester. (The "requester" typically would be an application program.) Preferably, an authorized requester should be able to poll remote mobile units, and fetch data, without manual user intervention at the remote location. In other words, a polling process should be able to be completely automated, although for some applications it can be advantageously initiated by a user at the requester end.

To illustrate, a wireless automated inventory control system may seek to poll units, say trucks or tanks, to learn their present location, fuel supply, operator ID, etc. A packet data connection, for example an IP connection, cannot be established with a mobile unit from the network side (we call this "network initiated") using prior technology, because the mobile device has no predetermined IP address. Rather, an IP address is dynamically assigned to a mobile unit only if and when it initiates a session to an IP network. Accordingly, a user application cannot poll a remote mobile unit to establish a packet data transfer session using known technologies.

A system has been suggested for IP addressing of GPRS mobile terminals that purportedly would enable TCP/IP connection without a phone call. That proposal recognized that there are not enough IP addresses available (under the current Ipv4 regime) to assign one to every wireless terminal. The proposal calls for a combination of Public Addresses (registered with public routing tables) and Private addresses, not to be routed on the public Internet. Rather, the private (IP-like) addresses would only be used within a GPRS operator's own network. This would require network address translation (NAT) facilities and is generally impractical. Even if implemented, such a scheme does not solve the problem that the mobile (or wireless) terminal address is unknown, and is not publicly discoverable in a convenient way.

The need remains for a convenient and effective way to poll a remote mobile unit, that is, to request a data packet session, for uploading or downloading data via the wireless network, without changing the wireless carrier infrastructure and in a manner compatible with existing packet data networks and protocols such as IP.

SUMMARY

In accordance with one embodiment of the present invention, a combination of in-band or voice channel signaling together with packet data services is employed to overcome the lack of a predetermined IP address of a mobile unit. A voice call is established between a requester and the remote mobile unit. A short polling message is transmitted in the voice channel from the requester using in-band digital data transmission ("IBS"). The request message includes in its payload data that identifies (directly or indirectly) a target resource such as a URL or IP address. The mobile unit responds by initiating a wireless packet data session with the indicated target resource which may be, for example, a server system.

This new approach of using the voice channel signaling to enable a network initiated data session will solve the existing problem associated with assigning an IP address (Simple IP and Mobile IP assignment for both Ipv4 and IPv6) to a mobile device and do so in a timely and more efficient manner.

Presently the existing cellular infrastructure does not allow mobile devices to pre-register their IP address with the cellular data network, instead it must be assigned to the mobile device by the cellular data network when a mobile device first initiates a request for a data session using a Simple IP protocol, or the mobile device must initiate an IP address discovery process using the Mobile IP protocol. In either case the cellular data network does not know of the routing location of the IP address for a mobile device until the mobile device first initiates a data session.

The core data network of any data enabled cellular network can use this unique invention to initiate a data transfer session, which we will call a Network Initiated Data Session (NIDS) and is described as follows:

According to one aspect of the invention, in-band signaling methods and apparatus are employed to "push" a request to a mobile unit or "node". We call this a Mobile Terminated (MT) request. (The mobile device is of course in-band signaling enabled, meaning essentially that it can send and receive digital data through the voice channel of a wireless network.)

The receiving mobile unit (mobile node) detects—and triggers the mobile device (or other system coupled to the mobile device) to initiate a data session with the cellular network using an available data channel, not the voice channel, to transmit data to a specified (or default) destination.

When a request is made of the mobile device, by using voice channel signaling, the network can initiate a data session between the mobile device and any network or internet entity at any time using the voice channel of the cellular network, or any other radio frequency derived audio channel where voice channel signaling functions. Due to the real time speed and quality of service of in-band (voice channel) services, a distinct time savings and reliability advantage can be made over any other approach for network initiated data sessions. These advantages are of paramount importance for public safety and security applications.

The present invention is also independent of any digital cellular technology and is not tied to any individual cellular carrier's voice, data, or messaging service, which is also unique and advantageous offering greater cellular coverage capabilities when compared to existing approaches.

Additional aspects and advantages will be apparent from the following detailed description of preferred embodiments, which proceeds with reference to the accompanying drawings.

DETAILED DESCRIPTION OF PREFERRED EMBODIMENTS

Reference is now made to the figures in which like reference numerals refer to like elements. For clarity, the first digit of a reference numeral indicates the figure number in which the corresponding element is first used.

In the following description, certain specific details of programming, software modules, user selections, network transactions, database queries, database structures, etc., are provided for a thorough understanding of the embodiments of the invention. However, those skilled in the art will recognize that the invention can be practiced without one or more of the specific details, or with other methods, components, materials, etc.

In some cases, well-known structures, materials, or operations are not shown or described in detail in order to avoid obscuring aspects of the invention. Furthermore, the described features, structures, or characteristics may be combined in any suitable manner in one or more embodiments.

Figure 1:
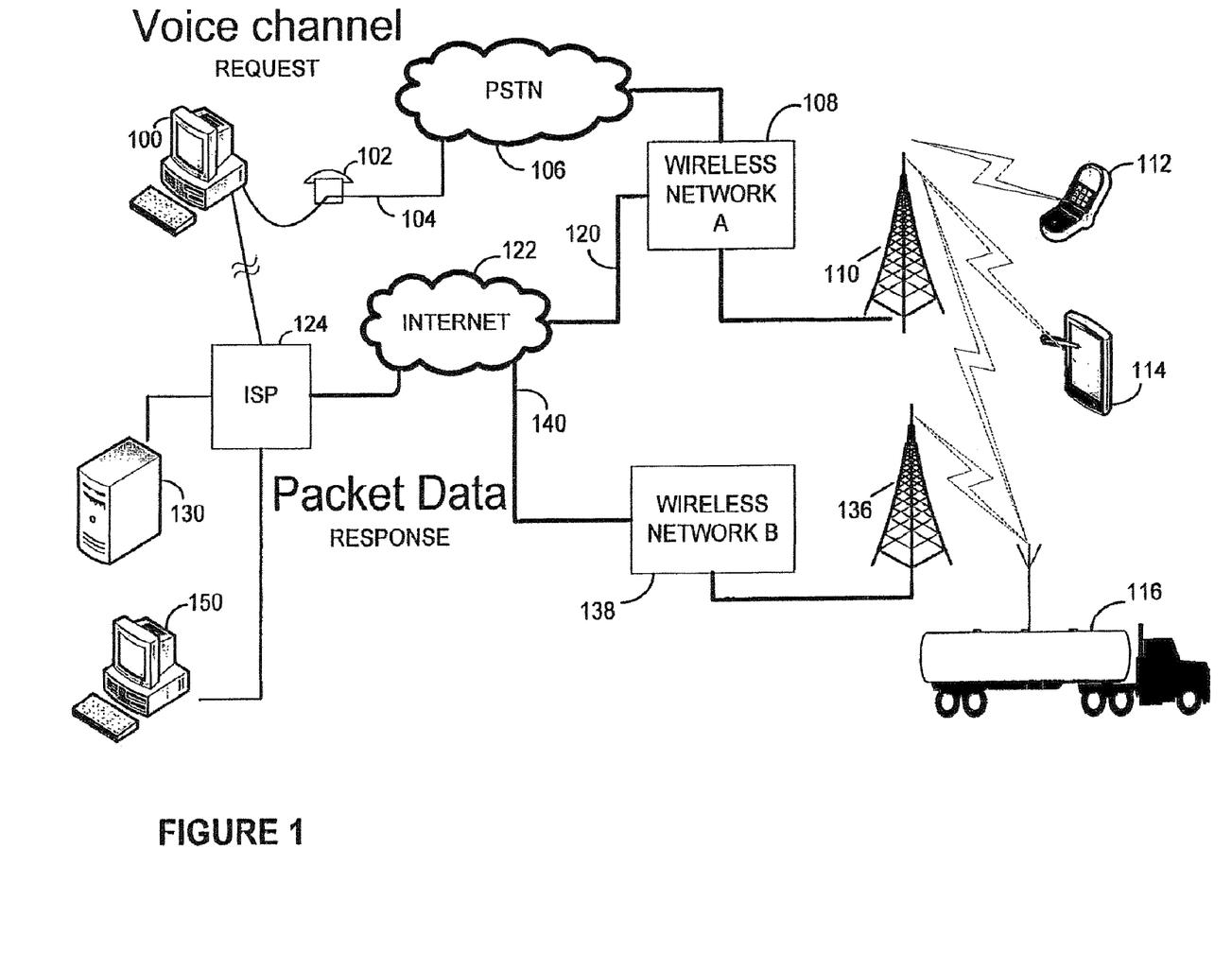
FIG. 1 is a simplified high-level diagram illustrating operation of representative embodiments of the invention.

FIG. 1 is a simplified high-level diagram illustrating certain embodiments of the methodology of the present invention. Referring to FIG. 1, a requester application program can be provided on a suitable computer 100. The request or polling application can be activated by a user as needed or preprogrammed for automatic operation at scheduled times. The computer system 100 is coupled to a telephone line which may include a conventional telephone 102 and in any event is connected via 104 to the public switched telephone network PSTN 106. This connection can be, for example, an ordinary telephone land line as is commonly used for voice calls. It could also be part of a larger enterprise system that may involve a PBX (not shown), or it may be a wireless telecom connection.

A wireless carrier network 108 is connected to the PSTN 106 for handling wireless call traffic, the details of which are well known. The wireless network 108 includes a series of base stations which include antennas and wireless transceivers, generally referred to as a cell tower 110. Transceivers are mounted atop the cell tower 110 for two-way wireless communications with various wireless mobile devices such as a cell phone 112 or PDA 114. The base station antennas need not literally be mounted on a tower. In urban areas, in particular, they are more commonly affixed to buildings.

In accordance with the invention, a requester or a requester application executing on computer 100 initiates a voice telephone call, via the PSTN or wireless, directed to a remote mobile unit such as the cell phone 112. The connection from the requester application need not be hard wired to the PSTN but could itself be a wireless telephone link. The requester system 100 also may have access to the Internet 122, typically through an ISP (internet service provider) 124. The connection to the ISP could take any of various forms, for example utilizing cable or the PSTN network, as are known.

According to a preferred embodiment of the invention, a method is provided for polling the remote wireless unit as follows: First, the requester system 100 initiates a voice call to the remote wireless station. This of course requires that the telephone number of the device is known. Other kinds of mobile devices, such as the PDA 114 or even a motor vehicle 116 can include an apparatus that is configured to interact with the wireless network as if it were a cell phone, although it may not actually include a microphone or a speaker. For example, devices can be configured to automatically answer a wireless call, and provide the control channel signaling to emulate answering a cell phone. Once a voice call is established between the requester 100 and the remote wireless unit 112, the requester system 100 transmits a digital request message to the remote wireless terminal via the wireless voice channel on which the voice call is established. In other words, the digital request message is sent "in band" through the use of audio frequency tones that are arranged so that they will pass through the voice channel unobstructed.

The request message preferably includes a payload that identifies a target resource. In the remote wireless unit, for example 112, 114, apparatus or software is implemented that will respond to the digital request message by initiating a packet data session with the target resource identified in the request message. By "packet data session" we mean a data transfer session that utilizes one or more of the data services provided by the wireless carrier, as distinguished from voice services.

The target resource may be, but is not limited to, the requester system 100 itself. In other words, the wireless terminal 112 may be instructed to initiate a packet data session back to the requester system. That session would traverse link 120 from the wireless network infrastructure to the Internet 122 and thence to the requester 100 via the ISP 124. As noted, this process can be automated by implementing suitable software at the requester 100 and at the wireless unit 112 so that it can occur without user action at either end of the packet data session.

The target resource can be identified in the request message by a predetermined identifier, such as a simple alphanumeric name or code. The wireless terminal software can perform a look-up in memory to determine a corresponding URL or IP address. Alternatively, the target URL or IP address can be included in the request message itself.

The target resource need not be the requesting system 100. In one alternative embodiment, it could be a server 130 which is coupled to the Internet through an ISP and configured to perform data collection, utilizing standard packet data session protocols such as the Internet protocol. The target may be a web server suitably configured to interact with the mobile unit.

In other embodiments, the request message payload can include various delivery parameters, in addition to identification of a target resource. The delivery parameters might include, by way of example and not limitation, a preferred packet data service, a packet data rate, and/or a priority parameter. These parameters can be recovered from the message payload by the wireless terminal software and it can initiate a responsive packet data session in accordance with those parameters. For example, in the case of a relatively low priority parameter, the application software might select a data service or time of day to initiate the packet data session that is lower performance but incurs lower cost.

Referring again to FIG. 1, the tanker truck 116 is merely illustrative of a wide variety of mobile assets, including but not limited to motor vehicle assets, that could participate in the present system, assuming they are outfitted with a wireless unit as explained above. FIG. 1 also shows a second wireless base station tower 136 illustrating that the packet data session need not involve the same base station, or even the same wireless carrier, as that which carried the request message via the voice channel. The requested packet data session could occur through a second wireless network 138 which is also coupled to the Internet via 140. And again, the packet data session could be established with any target resource, including but not limited to the requester application 100 or a separate server 130.

In other embodiments of the invention, a live user or operator at a computer 150, having access to the Internet, could poll one or more remote wireless units to request a data transfer. For example, a user at say a public safety location such as a 911 emergency call taker, could access a web server (not shown) which has voice call telephone access such as 104. Through the means of a suitably programmed web page interface (using, for example, CGI scripting or the like), a user at 150 could initiate a request message which would take the form of a voice call from the web server, through the PSTN and the wireless network as described above, to a remote or mobile unit. The request message could include identification of the call taker center at 150 as the target resource to deliver requested information via a packet data session.

The present invention is not limited to downloading data from the wireless terminal to the requester. The requested packet data session could also be used to download information to the wireless terminal.

Figure 2:
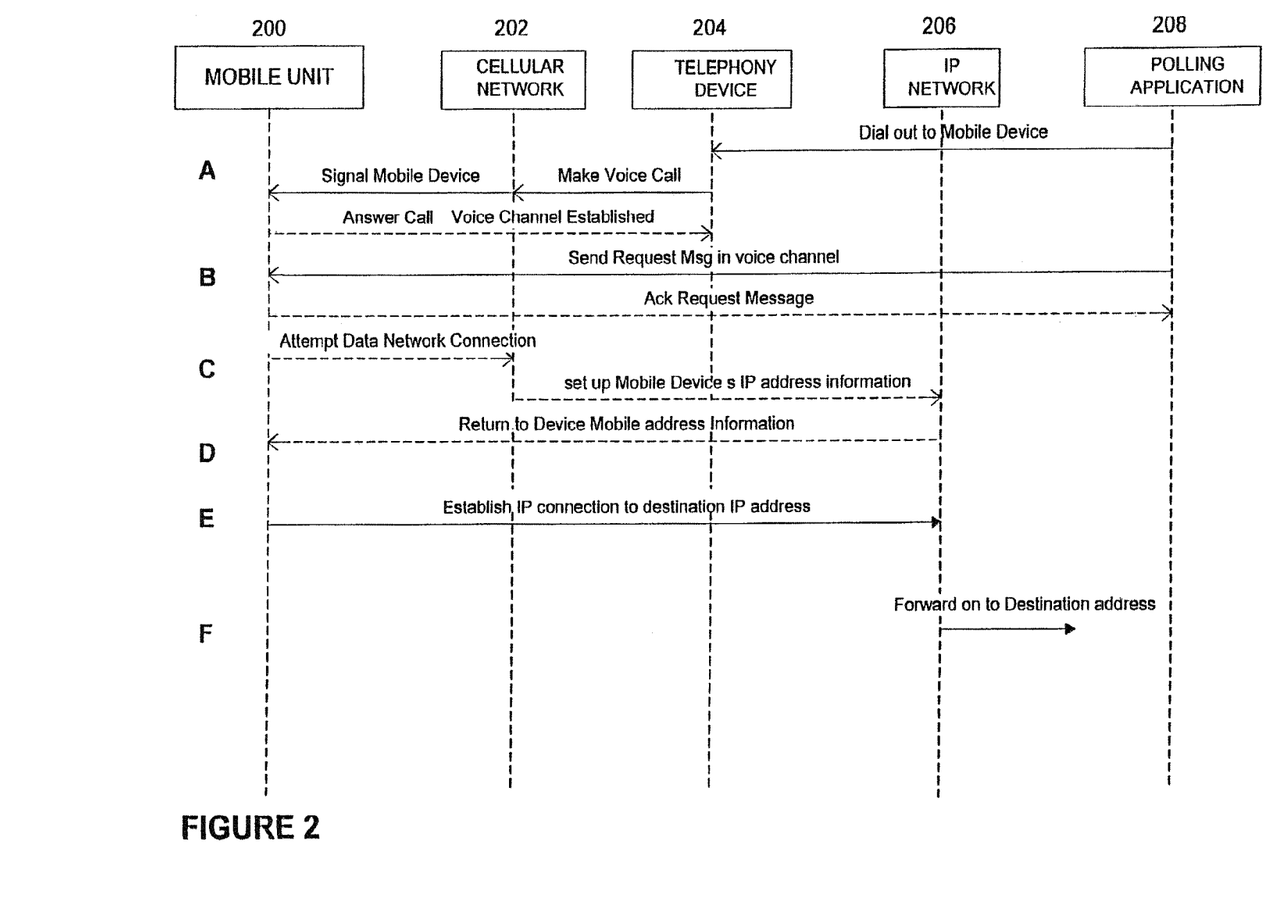
FIG. 2 is a messaging diagram showing principle interactions among nodes involved in an embodiment of the invention.

FIG. 2 is a messaging diagram that further illustrates principle features and characteristics of certain embodiments of the invention.

Referring to FIG. 2, a signaling or message flow diagram further illustrates methodologies in accordance with the present invention. Beginning with "time interval A" and initiating application 208 essentially places a voice call out to the mobile telephony device 204. As noted above, the initiating application could be a software application deployed on a computer or on a server and it may or may not necessarily require a conventional telephone. It does require access to the wireless network, directly or through the PSTN. The telephony device, in turn, makes a voice call through the cellular network 202 which in turn makes a wireless call to the mobile unit 200. The mobile unit answers the call, thereby establishing a voice channel "connection" back to the telephony device 204. Once that voice call is established, the initiating application, at "time interval B" transmits a request message in the voice channel to the mobile device 200. Optionally, the mobile device may respond with an acknowledgement message in the voice channel.

Referring now to "time point C," responsive to the request message, the mobile terminal 200 initiates a data network connection, which traverses the cellular network 202 and establishes a packet data session via the IP network 206. Here, the target or destination resource is coupled to the IP network 206. The IP network in turn responds to the mobile node 200 at "time point D" and then, as indicated at "time point E" a packet data session is established between the mobile node 200 and the IP network or target 206. "Time point F" indicates that the IP resource may not be the ultimate recipient of the data, but rather, it could be configured to forward that data to an ultimate destination address which may be, but is not limited to, the initiating application 208.

The process used by the core data network, internet application, or stand alone device to initiate a data session using aqLink begins with the establishment of a circuit switched voice channel connection to the mobile device. This can be accomplished by any means made available to the initiating application or device.

It will be obvious to those having skill in the art that many changes may be made to the details of the above-described embodiments without departing from the underlying principles of the invention. The scope of the present invention should, therefore, be determined only by the following claims.

The invention claimed is:

1. A memory device encoded with instructions that, if executed by a processor, result in:
   receiving incoming signaling at a wireless unit;
   in response to receiving the incoming signaling at the wireless unit, establishing a remotely initiated connection communicatively coupling the wireless unit and a remote server, the remotely initiated connection initiated by the remote server;

receiving, over the remotely initiated connection, a digital polling message at the wireless unit;

identifying a target address in the digital polling message; and in response to receiving the digital polling message, transmitting outgoing signaling to the target address to initiate a wireless network data session with the target address without manual user intervention at the wireless unit, the wireless network data session to be used by a computing device associated with the target address to pull data from the wireless unit over the wireless network data session.

2. The memory device according to claim 1, wherein the polling message includes at least one delivery parameter specifying at least one of a selected wireless network packet data service, a data rate, and a priority parameter.

3. The memory device according to claim 1, wherein the polling message identifies a type of data to be transmitted from the wireless unit to the target address in the wireless network data session.

4. The memory device according to claim 3, wherein the type of data to be transmitted is data indicating a location of the wireless unit.

5. The memory device according to claim 1, wherein the polling message is transmitted in a voice call via a digital wireless telecommunications network.

6. A system, comprising:
a transmitter configured to transmit incoming signaling to a wireless unit to establish an outbound connection thereto, the outbound connection initiated by the transmitter;

the transmitter configured to transmit a digital polling message specifying a target address over the outbound connection; and the wireless unit configured to transmit outgoing signaling to the target address to initiate a wireless network data session with the target address in response to receiving the digital polling message and without manual user intervention at the wireless unit, the wireless network data session to be used by a computing device associated with the target address to pull data from the wireless unit over the wireless network data session.

7. The system of claim 6, wherein the polling message includes at least one delivery parameter specifying at least one of a selected wireless network packet data service, a data rate, and a priority parameter.

8. The system of claim 6, wherein the polling message identifies a type of data to be transmitted from the wireless unit to the target address in the wireless network data session.

9. The system of claim 8, wherein the type of data to be transmitted is data indicating a location of the wireless unit.

10. The system of claim 6, wherein the polling message is transmitted in a voice call via a digital wireless telecommunications network.

11. A method, comprising:
receiving incoming signaling at a wireless unit;

in response to receiving the incoming signaling at the wireless unit, establishing a remotely initiated connection communicatively coupling the wireless unit and a remote server, the remotely initiated connection initiated by the remote server;

receiving, over the remotely initiated connection, a digital polling message at the wireless unit;

identifying a target address in the digital polling message; and in response to receiving the digital polling message, transmitting outgoing signaling to the target address to initiate a wireless network data session with the target address without manual user intervention at the wireless unit, the wireless network data session to be used by a computing device associated with the target address to pull data from the wireless unit over the wireless network data session.

12. The method of claim 11, wherein the polling message includes at least one delivery parameter specifying at least one of a selected wireless network packet data service, a data rate, and a priority parameter.

13. The method of claim 11, wherein the polling message identifies a type of data to be transmitted from the wireless unit to the target address in the wireless network data session.

14. The method of claim 13, wherein the type of data to be transmitted is data indicating a location of the wireless unit.

15. The method of claim 11, wherein the polling message is transmitted in a voice call via a digital wireless telecommunications network.

* * * * *